United States Patent
Lubera (10) Patent No.: US 9,079,274 B2
(45) Date of Patent: Jul. 14, 2015

(54) SINGLE HELIX HEAT SHIELD FASTENER WITH ANTI-STRIPPING FEATURE

(71) Applicant: NEWFREY LLC, Newark, DE (US)

(72) Inventor: Daniel J. Lubera, Macomb, MI (US)

(73) Assignee: NEWFREY LLC, Newark, DE (US)

( * ) Notice: Subject to any disclaimer, the term of this patent is extended or adjusted under 35 U.S.C. 154(b) by 376 days.

(21) Appl. No.: 13/654,836

(22) Filed: Oct. 18, 2012

(65) Prior Publication Data

US 2014/0109378 A1 Apr. 24, 2014

(51) Int. Cl.
| F16B 39/28 | (2006.01) |
| B23P 11/00 | (2006.01) |
| F16B 31/02 | (2006.01) |
| F16B 37/02 | (2006.01) |

(52) U.S. Cl.
CPC ............... *B23P 11/00* (2013.01); *F16B 31/027* (2013.01); *F16B 37/02* (2013.01); *Y10T 29/49947* (2015.01); *Y10T 29/49948* (2015.01); *Y10T 29/49954* (2015.01); *Y10T 29/49963* (2015.01)

(58) Field of Classification Search
CPC ...... B23P 11/00; F16B 31/0237; F16B 37/02; F16B 31/027; Y10T 29/48847; Y10T 29/42248; Y10T 29/49954; Y10T 29/49963; Y10T 29/49976; Y10T 29/49948; B60R 13/0206; B60R 13/236
See application file for complete search history.

(56) References Cited

U.S. PATENT DOCUMENTS

| 2,969,705 | A | 1/1961 | Becker |
| 3,289,524 | A | 12/1966 | Rubin |
| 3,570,361 | A | 3/1971 | Tinnerman |
| 4,687,392 | A | 8/1987 | Bidwell |
| 5,444,603 | A | 8/1995 | Otsuka et al. |
| 5,707,193 | A | 1/1998 | Hasegawa |
| 6,997,662 | B2 | 2/2006 | Nishikawa |
| 7,985,042 | B1 | 7/2011 | Paxton |
| 2010/0047011 | A1* | 2/2010 | Eberle et al. ........... 403/280 |
| 2010/0310338 | A1 | 12/2010 | Diez Herrera |

FOREIGN PATENT DOCUMENTS

| JP | 2005076646 | 3/2005 |
| WO | WO 2007/088202 | 8/2007 |
| WO | WO 2010/085469 | 7/2010 |

* cited by examiner

*Primary Examiner* — John C Hong
(74) *Attorney, Agent, or Firm* — Harness, Dickey & Pierce, P.L.C.

(57) ABSTRACT

A fastener includes a circular shaped body having a dish-shaped interior including an inner flat plate integrally connected to and recessed with respect to an outer planar ring. Multiple connecting legs integrally connect the inner flat plate to the outer planar ring. The outer planar ring has a substantially circular perimeter. First and second deflectable wings are each integrally connected to and extend outwardly from the perimeter of the outer planar ring by first and second deflectable arms. The first and second deflectable wings directly contact opposed ones of multiple faces of a socket tool when the fastener is received in a socket cavity of the socket tool.

21 Claims, 9 Drawing Sheets

SINGLE HELIX HEAT SHIELD FASTENER WITH ANTI-STRIPPING FEATURE

FIELD

The present disclosure relates to a stamped metal material fastener that is threaded onto the threaded shank of a weld stud extending from a vehicle panel or structural member using a drive socket and used to retain a heat shield.

BACKGROUND

This section provides background information related to the present disclosure which is not necessarily prior art.

Fasteners or clips are known which are used to retain a heat shield, for example, proximate to a muffler or catalytic converter, or similar high temperature component. Known fastener designs used for this purpose have problems such as: (1) during installation, known fasteners can apply excessive torque to the stud holding the heat shield, thereby breaking off the stud; (2) known fasteners installed using a tool, such as a drive socket, can mar, deflect, or otherwise damage the body or the surface of the heat shield; and (3) single helix threaded connections, legs, or attachment portions of the fasteners are susceptible to corrosion due to environmental operating conditions, such as water, salt, dirt, etc., and are further susceptible to fracture under multiple cycles of heating/cooling such that when breakage occurs, the heat shield can come loose and/or vibrate.

SUMMARY

This section provides a general summary of the disclosure, and is not a comprehensive disclosure of its full scope or all of its features.

According to several aspects, a fastener includes a circular shaped body having a dish-shaped interior including an inner flat plate integrally connected to and recessed with respect to an outer planar ring. Multiple connecting legs integrally connect the inner flat plate to the outer planar ring. Pairs of first and second deflectable arms are integrally connected to a substantially circular perimeter of the outer planar ring. First and second deflectable wings are each integrally connected to one of the pairs of the first and second deflectable arms and extend outwardly from the perimeter of the outer planar ring.

According to further aspects, a fastener includes a substantially circular shaped body having a dish-shaped interior including an inner flat plate integrally connected to and recessed with respect to an outer planar ring. Multiple connecting legs integrally connect the inner flat plate to the outer planar ring. The outer planar ring has a substantially circular perimeter. First and second deflectable wings extend outwardly from and are each integrally connected to the perimeter of the outer planar ring by pairs of first and second deflectable arms. The first and second deflectable wings are adapted to directly contact opposed ones of multiple faces of a socket tool when the fastener is received in a socket cavity of the socket tool.

According to other aspects, a method is provided for installing a fastener to limit a torque applied. The fastener has a circular shaped body having a dish-shaped interior including an inner flat plate integrally connected to and recessed with respect to an outer planar ring, multiple connecting legs, an outer planar ring, and first and second deflectable wings. The method includes: integrally connecting the first and second deflectable wings to a perimeter of the outer planar ring such that the first and second deflectable wings extend outwardly of the outer planar ring; positioning the first and second deflectable wings in direct contact with opposed ones of multiple faces of a socket tool during insertion of the fastener into a socket cavity of the socket tool; and rotating the socket tool until a predetermined torque value of approximately 3.0 Nm or higher is applied to the first and second deflectable wings, thereby inwardly deflecting the first and second deflectable wings such that the first and second deflectable wings release inwardly away from the opposed ones of the multiple faces of the socket tool.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments, and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
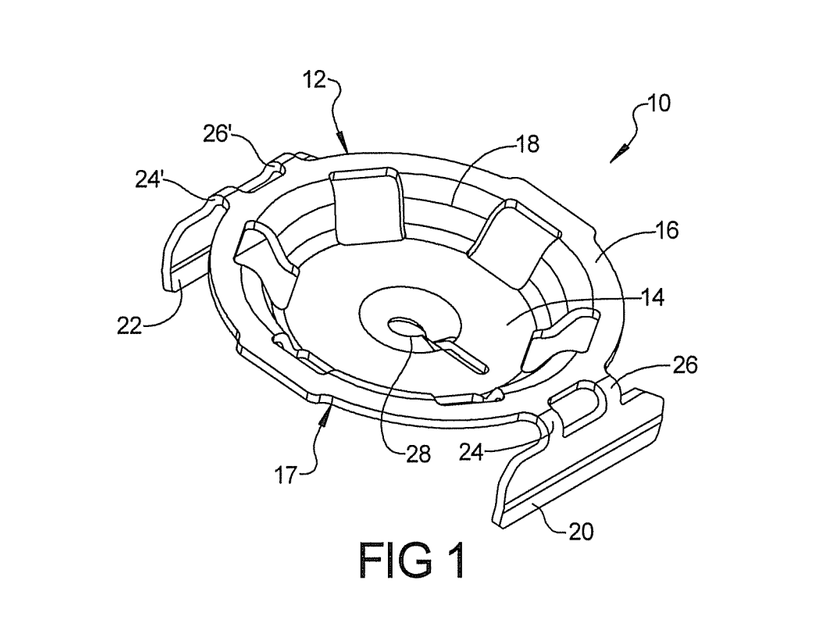
FIG. 1 is a front elevational perspective view of a single helix fastener with an anti-stripping feature of the present disclosure.

Referring to FIG. 1, a fastener 10 includes a generally circular shaped body 12 made, for example, from a steel. Body 12 includes a dish-shaped interior having a first or inner flat plate 14 integrally connected to a second plate created as an outer planar ring 16 using multiple connecting legs 18, with inner flat plate 14 recessed with respect to outer planar ring 16. Outer planar ring 16 has a circular perimeter wall 17 to which connecting legs 18 are integrally connected. First and second deflectable wings 20, 22 are integrally connected to and extend outwardly from outer ring 16. First and second pairs of first and second deflectable arms 24, 26 and 24', 26' individually integrally connect first and second deflectable wings 20, 22 to outer planar ring 16. A single helix screw 28 connection, such as a #10-16 helix, is centrally created in first plate 14.

Referring to FIG. 2 and again to FIG. 1, first and second deflectable wings 20, 22 of fastener 10 each include a window 30, 30'. Windows 30, 30' separate and define the first and second deflectable arms 24, 26 (24', 26') and are sized to provide flexibility for the first and second deflectable arms 24, 26 (24', 26'). The first and second deflectable wings 20, 22 can therefore collapse inwardly by bending of first and second deflectable arms 24, 26 (24', 26') when a predetermined torque value of approximately 3.0 Nm or higher is applied to the first and second deflectable wings 20, 22 during installation of fastener 10. According to further aspects, the first and second deflectable wings 20, 22 will collapse inwardly by bending of first and second deflectable arms 24, 26 (24', 26') when a predetermined torque value minimum of 1.2 Nm or higher torque value is applied to the first and second deflectable wings 20, 22 during installation of fastener 10. The first and second deflectable wings 20, 22 collapse to prevent an over-torque condition which will be described in greater detail in reference to FIGS. 5-8. A plurality of apertures 32 are also created in body 12 between planar ring 16 and inner flat plate 14 that define the individual connecting legs 18. The apertures 32 allow for fluid, such as water, contacting fastener 10 during vehicle operation to be displaced away from fastener 10. Each fastener 10 is cut/stamped from a metal strip during the stamping/forming process at individual cutoff faces 34.

Figure 2:
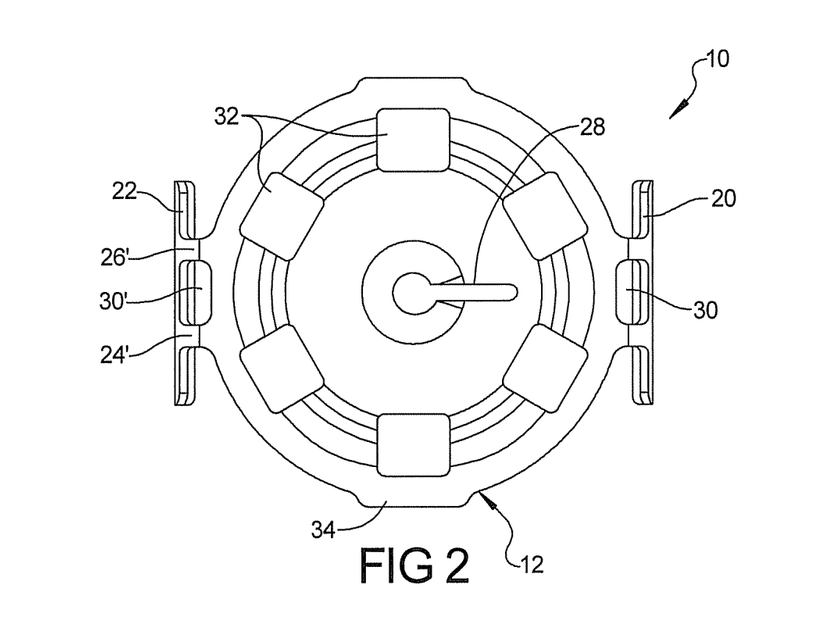
FIG. 2 is a top plan view of the fastener of FIG. 1.

Referring to FIG. 3 and again to FIGS. 1-2, the first and second deflectable wings 20, 22 are equally spaced with respect to a longitudinal central axis 36 of fastener 10. The first deflectable wing 20 includes a portion defining a free end 38 which is angled inwardly (towards central axis 36) which integrally transitions into a maximum outwardly extending portion 40. Extending portion 40 is therefore positioned at a maximum distance from central axis 36. Second deflectable wing 22 is oppositely facing/directed with respect to first deflectable wing 20 and similarly includes a free end 42 directed inwardly which transitions into a maximum outwardly extending portion 44. A spacing distance "A" is defined between the maximum outwardly extending portions 40, 44. Each of the first and second deflectable wings 20, 22 have a total length "B" with respect to a planar surface 46 of outer ring 16. The inner flat plate 14 is spaced from the outer ring 16 defining a depth or spacing "C".

Figure 3:
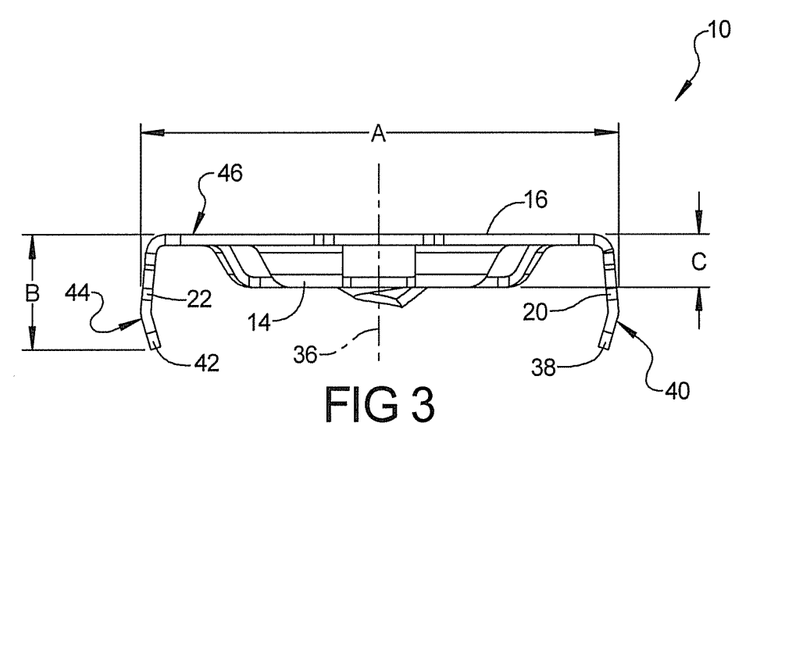
FIG. 3 is a front elevational view of the fastener of FIG. 1.
Figure 4:
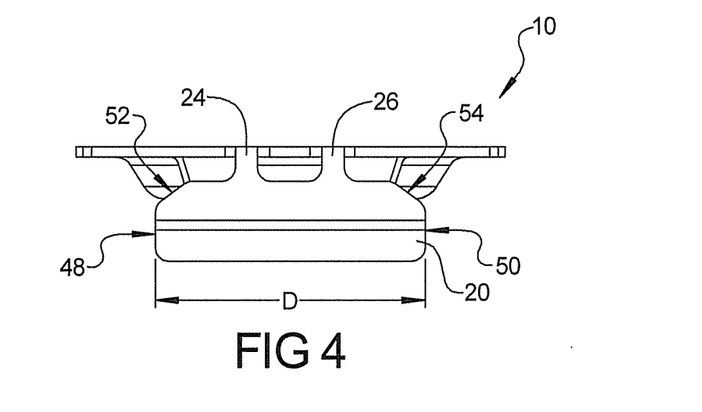
FIG. 4 is a side elevational view of the fastener of FIG. 1.
Figure 5:
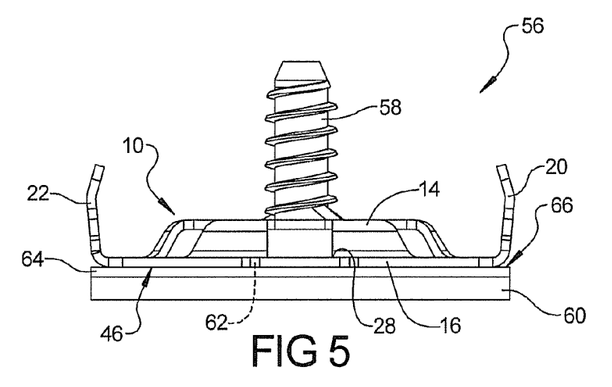
FIG. 5 is a reversed front elevational view of the fastener of FIG. 1 in an installed condition with a panel.
Figure 6:
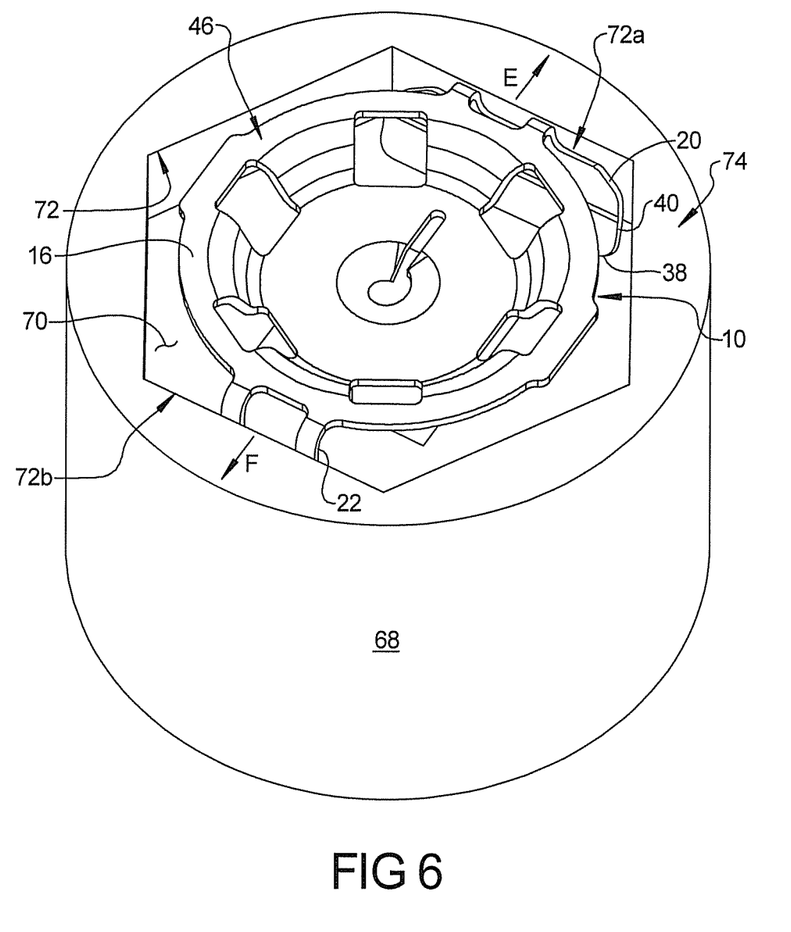
FIG. 6 is a front elevational perspective view similar to FIG. 1, showing the fastener received in a fastener installation tool.

Referring to FIG. 4 and again to FIGS. 1-3, each of the first and second deflectable wings 20, 22 (only first deflectable wing 20 is visible in FIG. 4) have a common total length "D" between opposed first and second ends 48, 50. An angled notch or cutoff 52, 54 is created at each of the first and second ends 48, 50 located proximate to the individual first or second deflectable arms 24 or 26.

Referring to FIG. 5, and again to FIGS. 1-4, an installed condition of fastener 10 is shown creating an installation assembly 56. Fastener 10 is installed by first aligning the single helix screw 28 of fastener 10 with a threaded weld stud 58 fixed to and extending from a first component 60 such as a vehicle panel, muffler, or the like. Weld stud 58 extends freely through an aperture 62 created in second component such as a heat shield 64. Fastener 10 is then rotated in a clockwise rotational direction until the planar surface 46 of outer ring 16 directly contacts a surface 66 of heat shield 64. At this time, fastener 10 is torqued by further rotation in the clockwise rotational direction up to a predetermined torque value. According to several aspects, a minimum torque of 2 Nm is required to seat fastener 10 to connect heat shield 64 to component 60. In a preferred installation, a torque value ranging between at least 3.0 Nm and up to approximately 3.5 Nm is applied to fastener 10. The 3.0 Nm or greater torque value causes the first and second deflectable wings 20, 22 to inwardly deflect, which thereafter allows the installation tool, such as a socket (shown in reference to FIG. 6), to spin freely with respect to first and second deflectable wings 20, 22, which is described in reference to FIGS. 6-8.

Referring to FIG. 6, and again to FIGS. 1-5, an industry standard 30 mm installation socket 68 can be used to install fastener 10. Socket 68 includes a geometrically shaped socket cavity 70 having for example six (6) faces 72 oriented perpendicularly with respect to an end face 74 of socket 68. Fastener 10 is received in cavity 70 as follows. The inwardly directed free ends 38, 42 allow the first and second deflectable wings 20, 22 to slide past the corners defined by two opposed ones of the six (6) faces 72. The maximum outwardly extending portions 40, 44 directly contact the two opposed faces 72, for example opposed faces 72a, 72b, which causes the first and second deflectable wings 20, 22 to inwardly deflect, creating opposed biasing forces "E", "F". Biasing forces "E", "F" help to retain fastener 10 in cavity 70 prior to application of the drive torque. It is noted the planar surface 46 of outer ring 16 extends clearly away (upwardly as viewed in FIG. 6) with respect to the end face 74 of socket 68 such that planar surface 46 of outer ring 16 will contact surface 66 of heat shield 64 without direct contact between surface 66 and end face 74.

Referring to FIG. 7 and again to FIGS. 1-6, with fastener 10 fully received in cavity 70 of socket 68, socket 68 is rotated in a clockwise direction "G" to engage single helix screw 28 with threaded weld stud 58. Once the predetermined torque value of at least 3.0 Nm has been reached, continued direct contact between the first ends 48, 48' of both first and second deflectable wings 20, 22 with an inside corner 75, 75' of faces 72a, 72b, respectively, causes the first and second deflectable wings 20, 22 to deflect inwardly in opposed deflection directions "H", "H", thereafter permitting the socket 68 to continue to rotate without further rotation of fastener 10 and therefore without exceeding the 3.0 Nm torque value applied to weld stud 58. This deflection occurs by bending of the first and second deflectable arms 24, 26 (24', 26'). The material removed by creation of cutoffs 52, 54 (52', 54') helps initiate inward bending of first and second deflectable arms 24, 26 (24', 26'). It is also noted direct contact between second ends 50, 50' of first and second deflectable wings 20, 22 with opposite inside corners 76, 76' of faces 72a, 72b can also occur.

Figure 7:
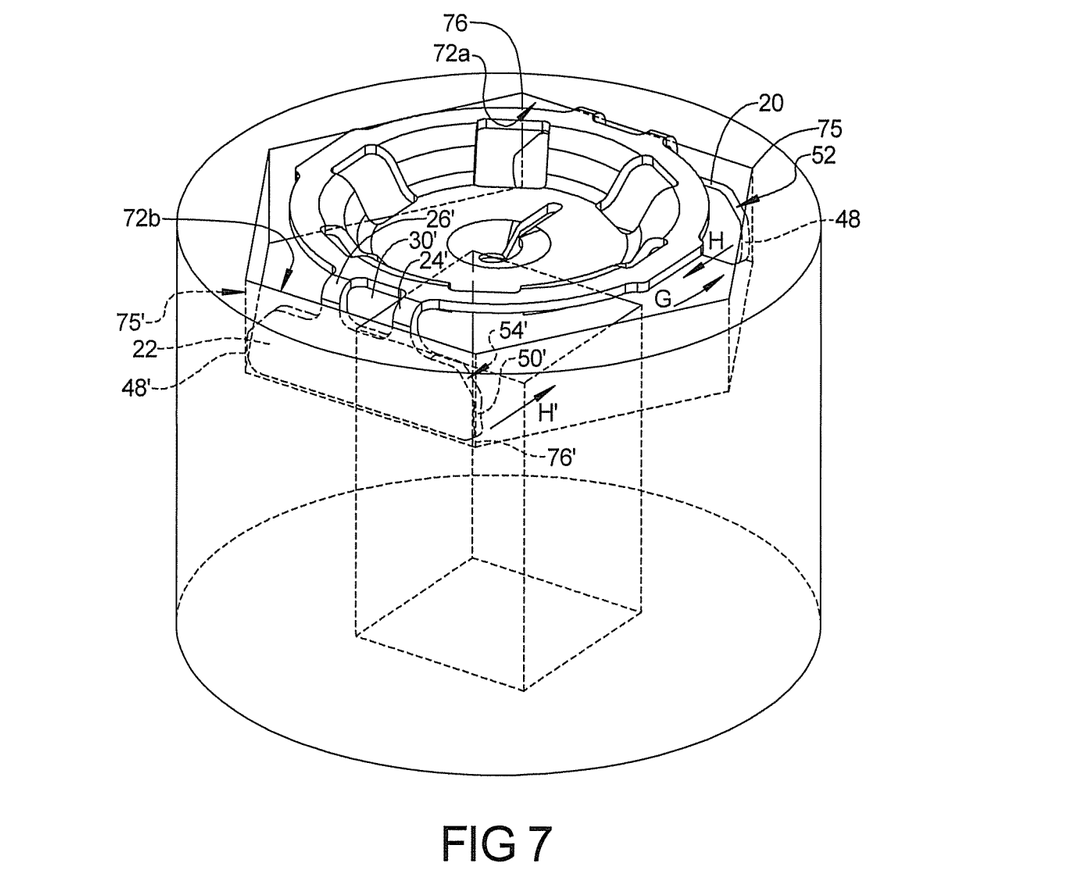
FIG. 7 is a partial cross sectional front elevational perspective view similar to FIG. 6.
Figure 8:
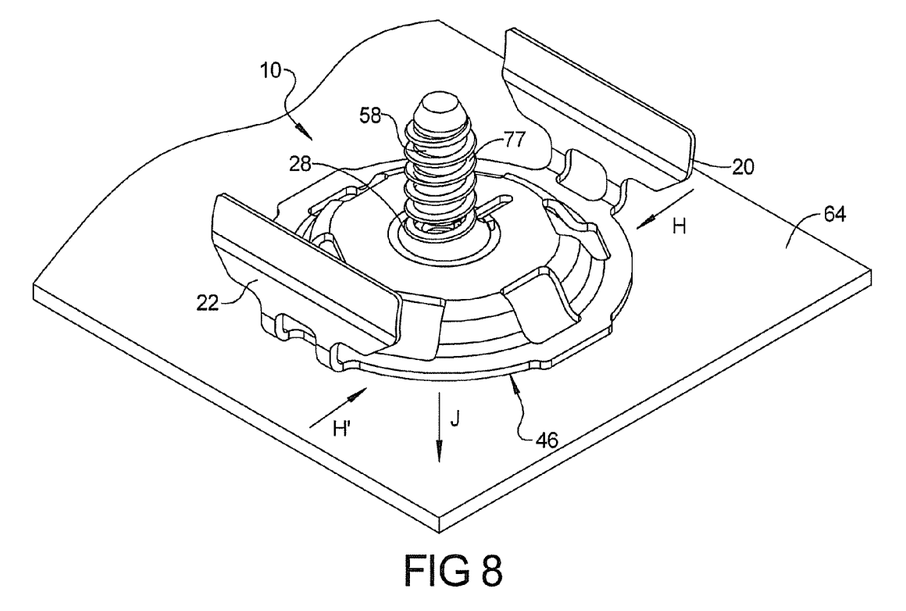
FIG. 8 is a bottom perspective view of the fastener installed condition of FIG. 5.
Figure 9:
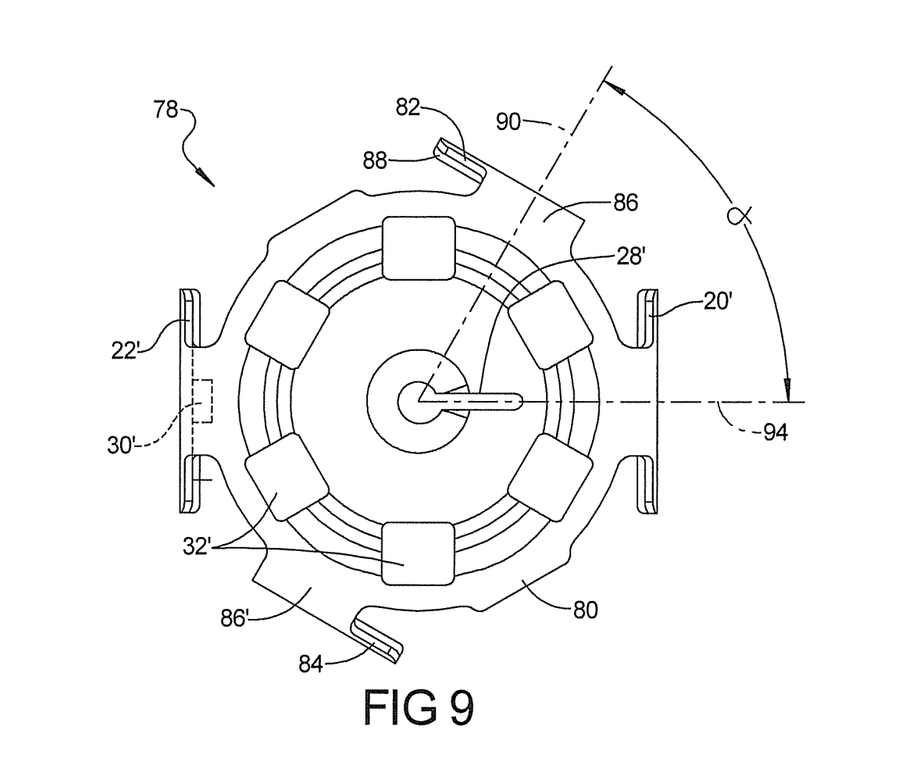
FIG. 9 is a top plan view of another aspect of a fastener of the present disclosure.
Figure 10:
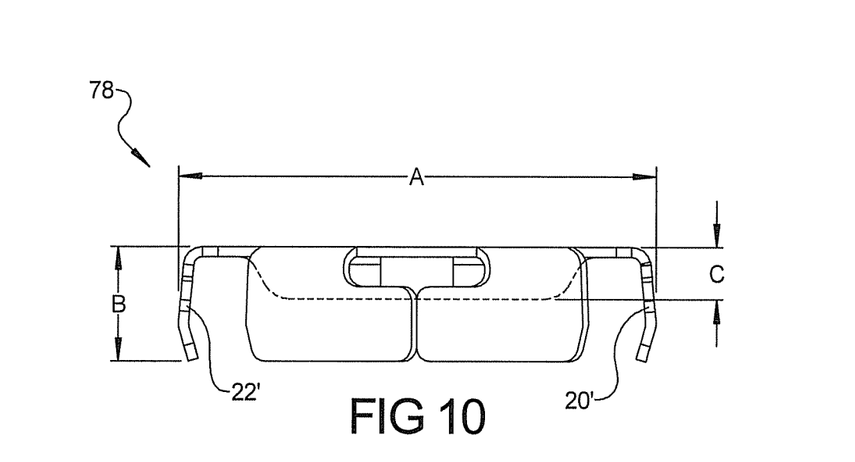
FIG. 10 is a front elevational view of the fastener of FIG. 9.
Figure 11:
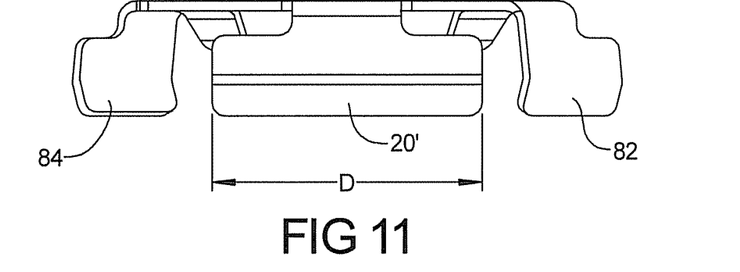
FIG. 11 is an end elevational view of the fastener of FIG. 9.
Figure 12:
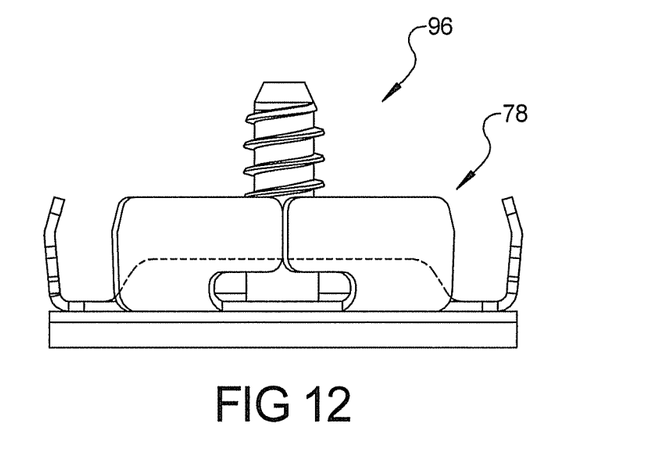
FIG. 12 is a reversed front elevational view of the fastener of FIG. 9 in an installed condition with a panel.
Figure 13:
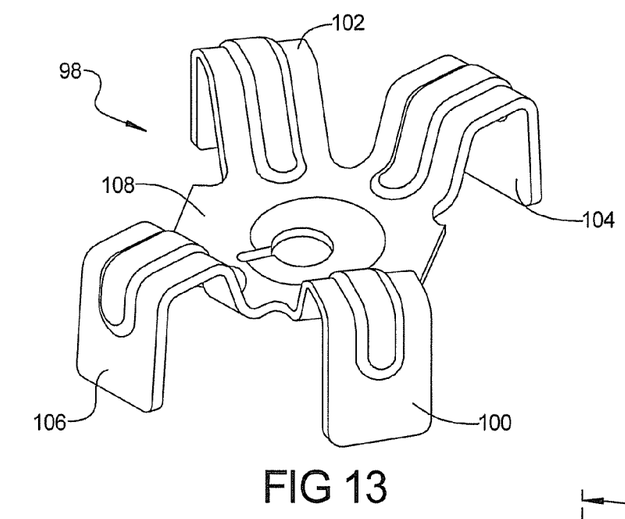
FIG. 13 is a front elevational perspective view of another aspect of a single helix fastener with an anti-stripping feature of the present disclosure.
Figure 14:
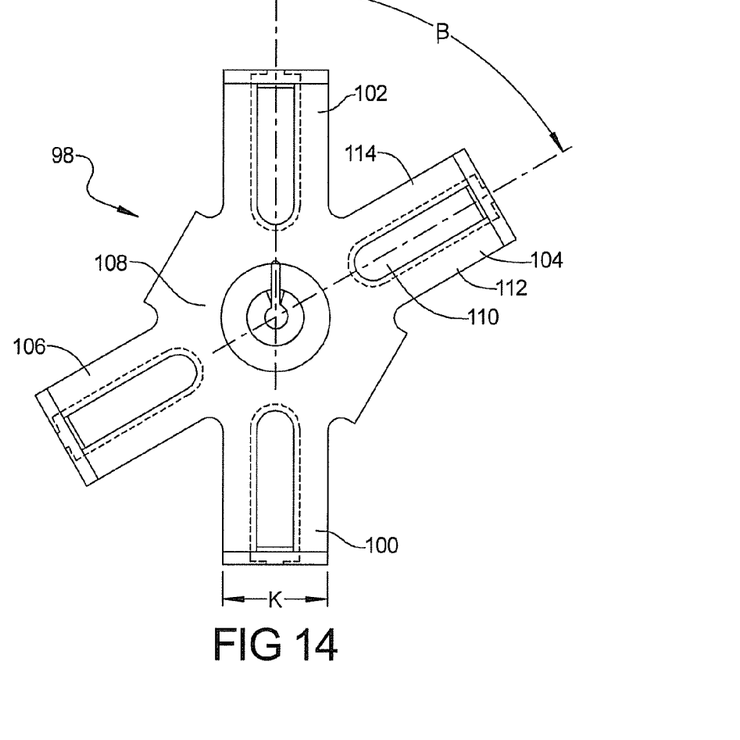
FIG. 14 is a top plan view of the fastener of FIG. 13.
Figure 15:
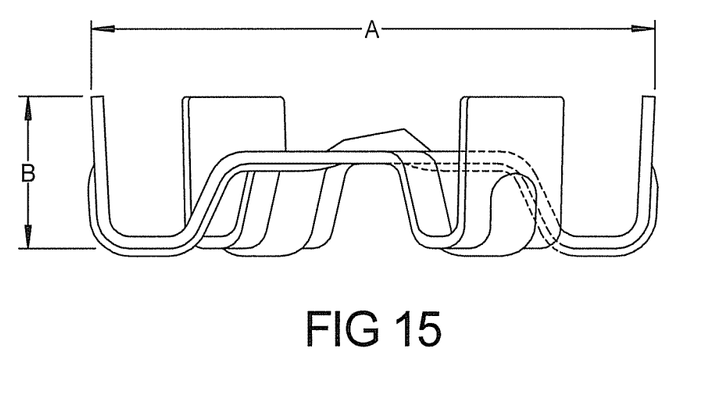
FIG. 15 is a front elevational view of the fastener of FIG. 13.
Figure 16:
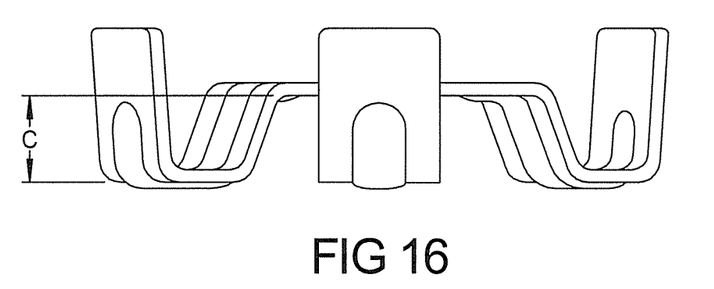
FIG. 16 is an end elevational view of the fastener of FIG. 13.

Fastener 10 is received in geometrically shaped socket cavity 70 of socket 68 and shown prior to application of installation torque. First and second deflectable wings 20, 22 are positioned in direct contact with opposed faces 72a, 72b of socket 68. Opposed first and second ends 48, 50 are in direct contact with or positioned proximate to inside corners 75, 76, and first and second ends 48', 50' are in direct contact with or positioned proximate to inside corners 75', 76'. The inwardly directed free ends 38, 42 allow the first and second deflectable wings 20, 22 to slide into socket cavity 70 by sliding contact with the opposed faces 72a, 72b of socket 68. The maximum outwardly extending portions 40, 44 directly contact opposed faces 72a, 72b and inwardly deflect toward each other to create the opposed biasing forces "E", "F" which frictionally retain fastener 10 prior to and during application of the drive torque. The inward deflection of first and second deflectable wings 20, 22 occurs due to elastic bending of the first and second deflectable arms 24, 26 (24', 26') defining a first bending phase. The initial position of the first and second deflectable wings 20, 22 and the first and second deflectable arms 24, 26 (24', 26') extending entirely outside of the perimeter wall 17 ensures that only the first and second deflectable wings 20, 22 contact the faces 72 of socket 68.

With fastener 10 fully received in cavity 70 of socket 68, the single helix screw 28 is axially aligned with threaded weld stud 58, and socket 68 is rotated in the clockwise direction "G" to threadingly engage single helix screw 28 with threaded weld stud 58. Once the predetermined torque value of at least 3.0 Nm has been reached, continued direct contact between the first ends 48, 48' of both first and second deflectable wings 20, 22 with the inside corners 75, 75' of faces 72a, 72b deflects first and second deflectable wings 20, 22 further inwardly, defining a second bending phase of first and second deflectable wings 20, 22. During the second bending phase, first and second deflectable wings 20, 22 deflect in opposed deflection directions "H", "H", such that the first ends 48, 48' deflect inwardly with respect to inside corners 75, 75'. Material of the first and second deflectable arms 24, 26 (24', 26') yields during inward bending in the second bending phase, such that first and second deflectable wings 20, 22 are permanently inwardly deflected, thereby permitting the socket 68 to continue to rotate without further rotation of fastener 10 and therefore without exceeding the 3.0 Nm torque value applied to weld stud 58. Yielding the material of the first and second deflectable arms 24, 26 (24', 26') thereby defines an "anti-stripping feature" for fasteners of the present disclosure, which prevents single helix screw 28 of fastener 10 and/or the threads of weld stud 58 from stripping during installation of fastener 10, and from application of torque to fastener 10 which could damage/mar the material of head shield 64. The material removed by creation of cutoffs 52, 54 (52', 54') helps initiate inward bending of first and second deflectable arms 24, 26 (24', 26'). It is also noted direct contact between second ends 50, 50' of first and second deflectable wings 20, 22 with opposite inside corners 76, 76' of faces 72a, 72b can also occur.

Referring to FIG. 8, and again to FIGS. 1-6, in the installed position of fastener 10, multiple threads 77 of weld stud 58 extend outwardly from helix screw 28, and the first and second deflectable wings 20, 22 will be in their inwardly deflected positions. Fastener 10 applies holding pressure in a holding direction "J" to heat shield 64 by direct contact of planar surface 46 of outer ring 16 with surface 66 of heat shield 64.

Referring to FIGS. 9-12, and again to FIGS. 1-8, according to other aspects, a fastener 78 is modified from fastener 10 to provide additional third and fourth deflectable wings 82, 84. Third and fourth deflectable wings 82, 84 are each connected by a deflectable arm 86 to body 80. Similar to fastener 10, windows 30' can be created in the deflectable arms 86, 86' to improve the deflection of deflectable wings 82, 84. Third and fourth deflectable wings 82, 84 can be modified from first and second deflectable wings 20', 22' by use of an extending portion 88 which is only provided on a first side of a central axis 90 extending through both deflectable wings 82, 84. The third and fourth deflectable wings 82, 84 can be oriented at an angle α ranging between approximately 20 to 90 degrees with respect to a central axis 94 of deflectable wings 20', 22' to contact other opposed ones of the faces 72 of socket 68. Spacing distance "A", total length "B", depth or spacing "C", and common total length "D" of fastener 10 are retained for fastener 78. The first, second, third, and fourth deflectable wings 20', 22', 82, 84 increase the number of faces 72 of socket 68 contacted by fastener 78 and thereby increase a surface area of fastener 78 in contact with socket 68.

Referring to FIGS. 13-16, and again to FIGS. 1-12, according to other aspects, a fastener 98 is modified from fastener 10 to provide longitudinally extending first, second, third, and fourth deflectable wings 100, 102, 104, 106. First, second, third, and fourth deflectable wings 100, 102, 104, 106 are each connected to a body 108. The substantially circular perimeter wall 17 of fastener 10 is eliminated in fastener 98 to reduce a body area of body 108. First, second, third, and fourth deflectable wings 100, 102, 104, 106 can each include an elongated slot 110 which creates opposing deflectable arms 112, 114, allowing a predetermined amount of deflection of first, second, third, and fourth deflectable wings 100, 102, 104, 106 with respect to body 108. First, second, third, and fourth deflectable wings 100, 102, 104, 106 can be oriented at different angles β ranging between approximately 20 to 90 degrees with respect to each other. Spacing distance "A", total length "B", and depth or spacing "C" of fastener 10 can also be retained for fastener 98.

Fasteners of the present disclosure offer several advantages, including: (1) metal fastener 10 having at least first and second deflectable wings 20, 22 that inwardly deflect when the fastener is torqued to a predetermined torque value to allow the socket used to install the fastener to subsequently spin freely with respect to the fastener; (2) the windows 30, 30' creating the first and second arms 24, 26 (24', 26') that direct and allow the wings to inwardly collapse; (3) the use of cutoffs 52, 54 on each wing that helps initiate inward displacement of the wings in deflection directions "H"; and (4) the maximum outwardly extending portions 40, 44 that directly contact two of the faces 72, for example opposed faces 72a, 72b, and cause the first and second deflectable wings 20, 22 to inwardly deflect, creating a biasing force acting as each of the opposed first and second biasing forces "E", "F" hold the fastener in the cavity of the socket prior to installation.

Example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fastener, comprising:
   a circular shaped body having a dish-shaped interior including an inner flat plate integrally connected to and recessed with respect to an outer planar ring;
   multiple connecting legs integrally extending from the inner flat plate to the outer planar ring;
   pairs of first and second deflectable arms integrally extending radially outwardly from a substantially circular perimeter of the outer planar ring; and
   first and second deflectable wings each integrally extending from one of the pairs of the first and second deflectable arms and positioned radially outwardly of the perimeter of the outer planar ring.

2. The fastener of claim 1, further including a single helix screw connection centrally created in the inner flat plate.

3. The fastener of claim 2, wherein the single helix screw connection is a #10-16 helix centrally positioned between the first and second deflectable wings.

4. The fastener of claim 1, wherein the first and second deflectable wings are equally spaced with respect to a longitudinal central axis of the fastener.

5. The fastener of claim 4, wherein each of the first and second deflectable wings includes a portion defining a free end which is angled inwardly towards the central axis and which integrally transitions into a maximum outwardly extending portion positioned at a maximum distance from the central axis.

6. The fastener of claim 1, wherein the second deflectable wing is oppositely facing/directed with respect to the first deflectable wing, and each of the first and second deflectable wings has a total length with respect to a planar surface of the outer planar ring.

7. The fastener of claim 1, further including a plurality of apertures created in the body between the outer planar ring and the inner flat plate individually defining the connecting legs, the apertures allowing a fluid contacting the fastener to be displaced away from the fastener.

8. The fastener of claim 1, wherein each of the first and second deflectable wings includes:
   a common total length between opposed first and second ends of the deflectable wings; and
   an angled cutoff created at each of the first and second ends located proximate to one of the first or second deflectable arms.

9. A fastener, comprising:
   a circular shaped body having a dish-shaped interior including an inner flat plate integrally connected to and recessed with respect to an outer planar ring;
   multiple connecting legs integrally connecting the inner flat plate to the outer planar ring;
   pairs of first and second deflectable arms integrally connected to a substantially circular perimeter of the outer planar ring; and
   first and second deflectable wings each integrally connected to one of the pairs of the first and second deflectable arms and extending outwardly from the perimeter of the outer planar ring;
   wherein the first and second deflectable wings each include a window separating and defining the first and second deflectable arms, the window sized to predetermine a flexibility for the first and second deflectable arms.

10. The fastener of claim 9, wherein the first and second deflectable wings are adapted to collapse inwardly toward the inner flat plate by bending of the first and second deflectable arms when a predetermined torque value of approximately 3.0 Nm or higher is applied to the first and second deflectable wings.

11. The fastener of claim 9, wherein the first and second deflectable wings are adapted to collapse inwardly toward the inner flat plate by bending of the first and second deflectable arms when a predetermined minimum torque value of approximately 1.2 Nm is applied to the first and second deflectable wings.

12. A fastener, comprising:
   a substantially circular shaped body having a dish-shaped interior including an inner flat plate integrally connected to and recessed with respect to an outer planar ring;
   multiple connecting legs integrally extending from the inner flat plate to the outer planar ring;
   the outer planar ring having a substantially circular perimeter; and first and second deflectable wings each being positioned radially outwardly of the perimeter of the outer planar ring and each deflectable wing integrally extending from the perimeter of the outer planar ring via radially outwardly extending pairs of first and second deflectable arms, the first and second deflectable wings being positioned to directly contact opposed ones of multiple faces of a socket tool, and being constructed to be drivingly rotated via such direct contact in response to rotation of, at least when the fastener is initially received in a socket cavity of the socket tool.

13. The fastener of claim 12, wherein each of the first and second deflectable wings includes a common total length between opposed first and second ends of the deflectable wings, the first and second ends each adapted to contact a corner created at adjoining ones of the multiple faces.

14. The fastener of claim 13, wherein the first and second deflectable wings are adapted to collapse inwardly toward the inner flat plate by bending of the first and second deflectable arms when a predetermined torque value of approximately 3.0 Nm or higher is applied to the first and second deflectable wings by rotation of the socket tool.

15. The fastener of claim 13, wherein the first and second deflectable wings are adapted to collapse inwardly toward the inner flat plate by bending of the first and second deflectable arms when a predetermined minimum torque value of 1.2 Nm is applied to the first and second deflectable wings by rotation of the socket tool.

16. The fastener of claim 12, wherein the first and second deflectable wings are equally spaced with respect to a longitudinal central axis of the fastener and each includes a portion defining a free end which is angled inwardly towards the central axis and which integrally transitions into a maximum outwardly extending portion positioned at a maximum distance from the central axis.

17. The fastener of claim 16, wherein the maximum outwardly extending portions are adapted to directly contact the opposed ones of the multiple faces and to inwardly deflect toward each other to create opposed biasing forces acting to frictionally retain the fastener in the socket cavity.

18. The fastener of claim 17, wherein the inward deflection of the first and second deflectable wings occurs due to elastic bending of the first and second deflectable arms defining a first bending phase.

19. The fastener of claim 12, wherein the first and second deflectable wings include inwardly directed free ends allowing the first and second deflectable wings to slide into the socket cavity by sliding contact with the opposed ones of the multiple faces of the socket tool.

20. The fastener of claim 12, wherein in an initial position the first and second deflectable wings and the first and second deflectable arms extend entirely outside of the perimeter of the outer planar ring such that only the first and second deflectable wings contact the faces of the socket tool.

21. A fastener, comprising:
a substantially circular shaped body having a dish-shaped interior including an inner flat plate integrally connected to and recessed with respect to an outer planar ring;
multiple connecting legs integrally connected to the inner flat plate to the outer planar ring;
the outer planar ring having a substantially circular perimeter; and
first and second deflectable wings each extending outwardly from the perimeter of the outer planar ring and each integrally connected to the perimeter of the outer planar ring by pairs of first and second deflectable arms, the first and second deflectable wings adapted to directly contact opposed ones of multiple faces of a socket tool when the fastener is received in a socket cavity of the socket tool;
wherein the first and second deflectable wings include radially inwardly directed free end portions.

* * * * *